(12) United States Patent
Jauch et al.

(10) Patent No.: US 11,987,126 B2
(45) Date of Patent: May 21, 2024

(54) ADJUSTMENT DEVICE FOR ACTIVATING OR DEACTIVATING AT LEAST ONE DRIVER ASSISTANCE SYSTEM AND/OR AT LEAST ONE DRIVE MODE FOR AN AUTONOMOUS DRIVE

(71) Applicant: ZF Friedrichshafen AG, Friedrichshafen (DE)

(72) Inventors: Andreas Jauch, Markdorf (DE); Christian Jansen, Meckenbeuren (DE)

(73) Assignee: SIGNATA GMBH, Diepholz (DE)

( * ) Notice: Subject to any disclaimer, the term of this patent is extended or adjusted under 35 U.S.C. 154(b) by 60 days.

(21) Appl. No.: 17/617,687

(22) PCT Filed: Jun. 8, 2020

(86) PCT No.: PCT/EP2020/065819
§ 371 (c)(1),
(2) Date: Dec. 9, 2021

(87) PCT Pub. No.: WO2020/249510
PCT Pub. Date: Dec. 17, 2020

(65) Prior Publication Data
US 2022/0234448 A1 Jul. 28, 2022

(30) Foreign Application Priority Data
Jun. 11, 2019 (DE) .......................... 102019208443.5

(51) Int. Cl.
*B60K 35/10* (2024.01)
*B60K 35/28* (2024.01)

(52) U.S. Cl.
CPC .............. *B60K 35/10* (2024.01); *B60K 35/28* (2024.01); *B60K 2360/126* (2024.01);
(Continued)

(58) Field of Classification Search
CPC .............. B60K 37/06; B60K 2370/175; B60K 2370/126; B60K 2370/128;
(Continued)

(56) References Cited

U.S. PATENT DOCUMENTS

| 7,633,485 B2 * | 12/2009 | Reed ...................... H01H 25/06 345/184 |
| 10,606,378 B2 * | 3/2020 | Rao .......................... G06F 9/451 |
| 2014/0183011 A1 * | 7/2014 | Park ..................... H01H 25/065 200/4 |

FOREIGN PATENT DOCUMENTS

| DE | 10 2007 029 594 A1 | 1/2009 |
| DE | 10 2017 124 688 A1 | 4/2018 |

(Continued)

OTHER PUBLICATIONS

International Search Report and Written Opinion of the International Search Authority dated Aug. 18, 2020 in International Application No. PCT/EP2020/065819 (English and German languages) (10 pp.).

(Continued)

*Primary Examiner* — Thomas C Diaz
(74) *Attorney, Agent, or Firm* — Crowell & Moring LLP

(57) ABSTRACT

An adjustment device for activating or deactivating at least one of a driver assistance system and a driver assistance mode for autonomous driving in a vehicle may include a push-button. The push-button may be configured to select at least one of the driver assistance system and the driver assistance mode upon rotation of the push-button. The push button may also be configured to activate or deactivate at least one of the driver assistance system and the driver assistance mode upon linear movement of the push-button due to a pushing action by an operator.

8 Claims, 1 Drawing Sheet

(52) U.S. Cl.
CPC .. *B60K 2360/128* (2024.01); *B60K 2360/175* (2024.01); *B60K 2360/345* (2024.01)

(58) Field of Classification Search
CPC ............. B60K 2370/345; H01H 25/06; H01H 25/065; F16H 59/12; F16H 2059/086
See application file for complete search history.

(56) References Cited

FOREIGN PATENT DOCUMENTS

| | | | |
|---|---|---|---|
| DE | 10 2017 114 990 B3 | 10/2018 | |
| DE | 102017114990 B3 * | 10/2018 | ............. B60K 37/06 |
| DE | 10 2017 211 383 A1 | 1/2019 | |
| FR | 3 042 448 | 4/2021 | |

OTHER PUBLICATIONS

Office Action dated Jun. 9, 2020 for German Patent Application No. 10 2019 208 443.5, (10 pp.), note: pp. 1 and 2 are English language Explanations to Section C. Result of Determination Document.

* cited by examiner

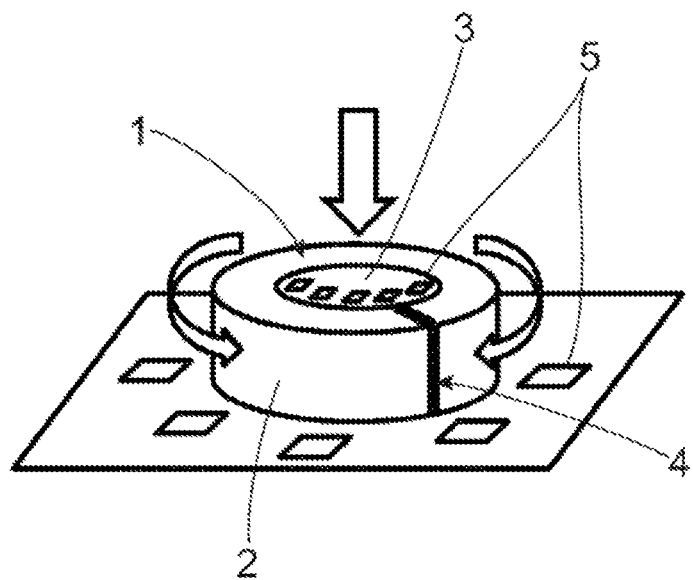

ADJUSTMENT DEVICE FOR ACTIVATING OR DEACTIVATING AT LEAST ONE DRIVER ASSISTANCE SYSTEM AND/OR AT LEAST ONE DRIVE MODE FOR AN AUTONOMOUS DRIVE

RELATED APPLICATION(S)

This application is a filing under 35 U.S.C. § 371 of International Patent Application PCT/EP2020/065819, filed Jun. 8, 2020, and claiming priority to German Patent Application DE10 2019 208 443.5, filed Jun. 11, 2019. All applications listed in this paragraph are hereby incorporated by reference in their entireties.

TECHNICAL FIELD

The present disclosure relates to an adjustment device for activating or deactivating at least one driver assistance system and/or at least one drive mode for an autonomous driving function in a vehicle.

BACKGROUND

Gearshift levers for selecting gears in an automatic transmission are known in the automotive industry. Different driver assistance systems such as lane keep assists, etc. are also known. Different stages or driving modes for autonomous driving are also known. Driver or driving assistance systems can be activated or deactivated in motor vehicles by pressing individual, separate hardware buttons. Furthermore, corresponding hooks can be removed or set to activate or deactivate driver assistance systems, which are shown in a software program on a screen in the vehicle. There is no central operating device for quickly activating or deactivating the driver assistance systems or drive modes during autonomous driving. This results in the disadvantage that the operation thereof by the driver is complicated, if, for example, the driver only needs to deactivate the system briefly, e.g. a temporary deactivation of the lane keeping assistance prior to a construction site, in which the assistance system is to be reactivated after passing the construction site. If the activation or deactivation of the driver assistance system or drive mode is complicated and takes time, this not only compromises driving safety, but also reduces user friendliness.

BRIEF DESCRIPTION OF THE DRAWINGS

FIG. 1 is an illustration showing a schematic three dimensional illustration of an adjustment device for activating or deactivating at least one driver assistance system and/or at least one drive mode for an autonomous driving of a vehicle in accordance with certain aspects of the present disclosure.

DETAILED DESCRIPTION

An object of certain aspects described herein is to propose an adjustment device of the type described in the introduction that enables the simplest and quickest possible activation and deactivation of driver assistance systems or drive modes in autonomous driving.

An adjustment device for activating or deactivating at least one driver or driving assistance system and/or at least one drive mode for autonomous driving, or a drive mode for an autonomous driving function in a vehicle, is therefore proposed. A simplest and quickest possible activation or deactivation of a driver assistance system or a drive mode is obtained in that there is a rotating push-button, and the at least one driver assistance system and/or drive mode can be selected by rotating the button, and activated or deactivated by pushing the button.

A rotating push-button is proposed in this manner, with which some, or preferably all of the available assistance systems or drive modes for autonomous driving in a motor vehicle that can be activated and deactivated by a driver of the vehicle can be selected by rotating the button, and activated or deactivated by pushing the button.

A drive mode for an autonomous driving function is understood in particular to mean that one or more specific driving functions are executed autonomously, i.e. without active participation by a user of the vehicle. By way of example, reference is made to an active adaptive cruise control (ACC), emergency braking function, active lane keeping assistance, lane changing assistance, parking assistance, or active steering (steering intervention). A characteristic for executing the respective drive mode can also be selected. It may be possible to select between an aggressive or economical or comfort oriented emphasis of the respective drive mode. A drive mode for autonomous driving is understood in particular to be an autonomy level for autonomous driving according to SAE J3016 (levels 0 to 5).

A user of the vehicle is understood to be an end user of the vehicle, who drives the vehicle as an occupant of the vehicle, or has the means to drive the vehicle itself, or travels along with the vehicle. A user of the vehicle can therefore be a driver. A user of the vehicle can also be a passenger. In an autonomous vehicle, a user can also be an occupant of the vehicle who can or should assume control of the vehicle in an emergency.

A rotating push-button is to be understood in particular to be a user interface (also referred to as a human machine interface) in the form of a component the enables both a first input through rotation, and a second input through pressing. In particular, there are no other movement possibilities and/or selection possibilities, and/or activation possibilities with the rotating push-button.

By way of example, with a rotating push-button as the proposed adjustment device, an activation can take place with a single pressing thereof, and a deactivation can take place with a double pressing thereof. Instead of a double pressing, a single pressing again can also result in a deactivation. The driver assistance system and/or drive mode can therefore be both activated (if it is not already active) and deactivated (if it is already activated) by pressing the rotating push-button. The manner of operation described above can also therefore be used for selecting the different drive modes for autonomous driving available in a motor vehicle. The respective assistance system or respective drive mode for autonomous driving can therefore be simply and quickly selected and activated or deactivated as needed. Driver assistance systems or drive modes that are inappropriate or impractical in some driving situations can thus be simply deactivated while driving, and quickly reactivated as needed.

The adjustment device can be configured such that the selected and activated drive mode or the selected and activated driver assistance system is deactivated by rotating the button. By rotating the button when a driver assistance system or drive mode is activated, this previously activated driver assistance system or previously activated drive mode is therefore deactivated. Pressing the button is therefore not necessary for deactivation. The drive mode or driver assistance system that is newly selected through this rotation is also not activated in this case. The drive mode or driver assistance system that is newly selected is then first activated when the button is pressed. This prevents an undesired drive mode or driver assistance system from being activated by unintentional rotating.

As explained above, the adjustment device can be designed such that the selected and active drive mode or selected and active driver assistance system is automatically deactivated by rotating the button. The adjustment device can also be configured such that by rotating the button back to this previously activated driver assistance system or this previously activated drive mode, this driver assistance system or drive mode is automatically reactivated. As a result, it is not necessary to press the button to reactivate the previous activation state. If driver assistance system or drive mode is activated, an unintentional rotating of the button resulting in a deactivation thereof can therefore be readily remedied in that the rotating push-button is turned back to its prior position The adjustment device can then also be configured such that the (automatically) renewed activation of the previously activated driver assistance system or previously activated drive mode is then only carried out if
  in the interim between the rotating and turning back of the button, no other driver assistance system or drive mode is activated by pressing the button, and/or
  the turning back of the button takes place within a predefined time interval.

In this manner, it is possible to prevent the adjustment device from causing an automatic activation of a driver assistance system or drive mode that surprises the driver.

A timer can be provided for detecting the timespan of this interim time. The timer is started when the button is rotated.

The structural design of the rotating push-button can be arbitrary as long as the rotation and pressing can be implemented. By way of example, the rotating push-button can conceivably be composed of numerous parts. In this context, the rotating push-button can comprise a ring that rotates about a central rotational axis, wherein the pushing of the button takes place via the rotational axis part. The ring is therefore coaxial to the rotational axis part, and the rotational axis part is then supported in a housing such that it can be moved axially to implement the pressing movement.

It is also conceivable that the rotating push-button is a single element. In this case, the entire button is supported such that it can be rotated and moved axially, and as a result of this support, in addition to the rotation, the button can also be pressed in order to activate and deactivate a selected driver assistance system or drive mode for autonomous driving.

Another aspect includes a method for operating the adjustment device in the manner described above. This also results in the advantages described above, and further advantages.

Certain aspects shall be explained in greater detail below in reference to the drawing.

The single FIG. 1 shows a schematic three dimensional illustration of one embodiment variation of an adjustment device for activating or deactivating at least one driver assistance system and/or at least one drive mode for an autonomous driving of a vehicle.

FIG. 1 shows that the embodiment variation, shown merely by way of example, illustrates a rotating push-button 1 with multiple parts. The rotating push-button 1 preferably forms a single component. The rotating push-button 1 has a rotating ring 2, which is coaxial to a central rotational axis part 3. The rotating ring 2 is rotated to select a driver assistance system and/or drive mode. When the desired rotational position is obtained, the selection is confirmed by pushing the central rotational axis part 3, and the driver assistance system or drive mode assigned thereto is activated or deactivated.

Numerous rotational positions are assigned to the rotating ring 2 of the rotating push-button 1 as selection positions, and the selection positions are then assigned to driver assistance systems and/or drive modes that can be selected. The individual rotational positions for the driver assistance systems and/or drive modes that can be selected are each represented by sections or regions 5 that can be visually indicated. Visually indicated regions 5 can be formed by lamps, displays and/or pictograms.

In this manner, the rotating push-button 1 of the adjustment device has numerous selection position that can be selected, at which positions there is a display or pictogram as a region 5 that can be indicated for the respective driver assistance system or the respective drive mode. In this manner, the respective driver assistance system or respective drive mode is displayed at the assigned position.

There can also be a collective display for some or all of the driver assistance systems or drive modes that can be selected on the rotating push-button 1. The display can be in the form of an LCD or OLED display, for example.

In the embodiment variation shown here, the visually indicated regions 5 are arranged on both the rotating ring 2 as well as the central rotational axis part 3. The visually indicated regions 5 make it possible to indicate the activation or deactivation to the driver, e.g. by lighting or dimming. The lights can also have different colors relating the respective operating states.

The assignment of the rotational positions to the driver assistance systems and/or drive modes that can be selected can be altered by the user. The rotating push-button 1 of the adjustment device can therefore be configured by the driver of the motor vehicle, such that the driver can at least partially determine where the driver assistance systems or drive modes that can be selected, and therefore activated or deactivated, are located. By altering the arrangement of the driver assistance systems or drive modes, the displaying thereof on a display is also altered.

In the framework of the method that is also claimed for operating the adjustment device, it is intended that by rotating the rotating push-button 1 of the adjustment device, a desired driver assistance system or a desired drive mode for autonomous driving is selected, and that by pressing the button 1, the selected driver assistance system or selected drive mode is activated or deactivated.

The rotating push-button 1 may be designed such that when the button is turned back to a previously selected and previously activated drive mode, this drive mode is automatically reactivated. This is also the case when the rotating push-button is rotated back to a previously activated driver assistance system, such that it is automatically reactivated without pressing the button. This takes place in particular only when the drive mode or driver assistance system newly selected by the rotation is not activated by pressing the button and/or when the rotation back takes place within a predefined timespan. Consequently, no other driver assistance system or drive mode can be activated by pressing the button in the interim time, and a predefined timespan cannot been exceeded.

The detection of the defined timespan can be implemented, for example, in that a countdown or timer is started in the predefined timespan when the rotating push-button 1 is rotated and a drive mode or driver assistance system is simultaneously activated. The timer is stopped when the button is pushed at the newly selected drive mode, or the newly selected driver assistance system, or when the predefined timespan has elapsed. The previously selected drive mode or previously selected driver assistance system then cannot be activated by simply rotating the button back to the previous position.

In this manner, an unintentional rotating of the rotating push-button 1 and the corresponding unintended deactivation of a drive mode or a driver assistance system can be simply reversed. At the same time, it is ensured by the predefined timespan, that a rotating back does not result in an unintended activation of a drive mode. The timespan can be short, e.g. 2 to 5 seconds.

REFERENCE SYMBOLS

1 rotating push-button
2 rotating ring
3 rotational axis part
4 indicator
5 visually indicated region

The invention claimed is:

1. An adjustment device for activating or deactivating at least one of a driver assistance system and a driver assistance mode for autonomous driving in a vehicle, the adjustment device comprising:
   a push-button,
   wherein the push-button is configured to select at least one of the driver assistance system and the driver assistance mode upon rotation of the push-button, and
   wherein the push button is configured to activate or deactivate at least one of the driver assistance system and the driver assistance mode upon linear movement of the push-button due to a pushing action by an operator,
   wherein one of the driver assistance systems or one of the driver assistance modes is selected by rotating the push-button, and that the selected driver assistance system or the selected driver assistance mode is activated or deactivated by pressing the push-button, and
   wherein rotating the push-button when the driver assistance system or the driver assistance mode is activated deactivates the selected driver assistance system or the selected driver assistance mode.

2. The adjustment device according to claim 1, wherein the push-button has a plurality of rotational positions forming selection positions for selecting a plurality of the driver assistance systems and/or the driver assistance modes, wherein the driver assistance systems and/or the driver assistance modes that are selectable are each assigned to a predefined rotational position of the plurality of rotational positions.

3. The adjustment device according to claim 2, wherein the rotational positions for the driver assistance systems and/or the driver assistance modes that are selectable are represented by visually indicated regions.

4. The adjustment device according to claim 3, further comprising at least one of a lamp, a display, and a pictogram that forms the visually indicated region.

5. The adjustment device according to claim 2, wherein the arrangement of the rotational positions in relation to the driver assistance systems and/or the driver assistance modes that are selectable can be altered by a vehicle's user.

6. The adjustment device according to claim 1, wherein the push-button comprises a rotating ring that is rotatable about a central rotating axis part, wherein the linear pushing movement takes place via the rotating axis part.

7. The adjustment device according to claim 1, wherein rotating the push-button back to the previously activated driver assistance system or the previously activated driver assistance mode reactivates the selected driver assistance system or the selected driver assistance mode.

8. The adjustment device according to claim 7, wherein the reactivation of the selected driver assistance system or the selected driver assistance mode is only carried out if no other driver assistance system or driver assistance mode was activated by pressing the button in the interim time, and/or if the push-button was rotated back within a predefined timespan.

* * * * *